United States Patent Office 2,902,418
Patented Sept. 1, 1959

2,902,418

PREPARATION OF PURE SODIUM CHLORIDE BRINES

Claude A. Burns, Lake Charles, La., assignor to Morton Salt Company, Chicago, Ill., a corporation of Illinois No Drawing. Application March 10, 1959
Serial No. 798,332

4 Claims. (Cl. 204—128)

This invention relates to an improved method for producing brine. It relates more particularly to the production of sodium chloride brine which is low in calcium and sulfate content, from rock salt which contains in admixture therewith, calcium sulfate.

There are a number of industrial processes where sodium chloride brine having a low sulfate and/or low calcium concentration is a desideratum, as in the production of chlorine, in the dyeing art, and in the production of soda ash and metallic sodium, to mention a few. Conventionally in the production of such purified brines, the practice has been to proceed either by dissolving rock salt in a salt dissolver, of which a number of types are commercially available, or pumping water down into the cavity of a brine well, removing the resulting brine from the salt dissolver (or from the brine well) and then adding a reagent or reagents of one kind or another to that brine so as to precipitate the undesirable components therein. Thus, calcium has been removed from brine by adding sodium carbonate thereto, in order to precipitate the calcium as calcium carbonate; magnesium and sulfate radicals have been removed from solution by precipitating them through the addition of alkali metal hydroxides and soluble barium salts, respectively.

These prior art techniques, however, are not entirely satisfactory, since such procedures are based on the formation and subsequent removal of precipitates, generally a costly and sometimes a difficult operation.

An improvement over the aforesaid well-known prior art techniques for producing purified brine is that procedure which is described and covered by U.S. Patent No. 2,433,601 to Comstock, and which is probably the best of the known methods, up to the present time, for the preparation of purified brine; in accordance with the method of that patent, either phosphates or carbonates are added to the salt or to the water before the salt and water are mixed in a salt dissolver, and the resulting brine quickly removed from the dissolver, the treatment resulting in inhibiting solution of calcium sulfate in the resulting brine.

The present invention, which is an improvement on the method described and claimed in the aforesaid Comstock patent, provides a simple and highly effective method for producing high purity brine, low in calcium sulfate content, under conditions wherein there is a relatively long contact time of salt and water, as is the case in brine well operations or in certain types of commercial salt dissolvers. By relatively long contact time is meant a period of time which may be as much as many weeks, months, or even longer.

Generally speaking, the method of this invention involves incorporating both (a) water-soluble carbonates or a mixture of such carbonates with water-soluble bicarbonates, and (b) molecularly dehydrated alkali metal phosphates having an $Na_2O$ to $P_2O_5$ ratio within a range of $Na_4P_2O_7$ to $NaPO_3$, into the dissolving water which is to be delivered to the salt dissolver or into the well cavity.

When my method is applied, for example, to brine production from a brine well, the brine which is subsequently removed from the well cavity will be found to be surprisingly and significantly lower in dissolved calcium sulfate content than when the dissolving water pumped into the cavity contains only carbonates (with or without bicarbonates), or only phosphates. In other words, the effect in inhibiting the solution of calcium sulfate in the brine, of carbonates (with or without bicarbonates) plus the phosphates referred to in (b) above, is significantly and unexpectedly greater than would be expected from the effectiveness of either the carbonates (with or without bicarbonates) alone, or of these phosphates alone. This synergistic phenomenon is not observed when the dissolving water contains carbonates plus trisodium phosphate, under those conditions which commonly prevail in producing brine from a brine well, e.g. where there is a relatively long contact time of the dissolving water with the salt in the well cavity, before the resulting brine is pumped from the well. Such a period of time, as already mentioned, may be weeks, or months, or longer.

As an illustration of the practice of my invention as applied to a brine well operation, water treated as hereinafter described, was pumped into a cavity within a subterranean deposit of salt, known as a salt dome, and brine was withdrawn from the cavity and conducted to chlorine cells for the production of chlorine gas (and a by-product cell liquor containing around 10% sodium hydroxide).

In the particular brine well operation being described, the water used had a rather high natural content of bicarbonates, which was transformed to sodium carbonate by adding thereto a measured amount of that cell-liquor.

While carbonates may thus be produced "in situ," so to speak, from the bicarbonates present in the dissolving water, one may of course use dissolving water which contains no naturally present bicarbonate or carbonate, in which case a soluble carbonate, such as sodium carbonate, is added to the dissolving water. But regardless of whether the carbonate component of the dissolving water is added as such, or is formed therein as above described, certain phosphates must be co-present with such carbonates, in the water to be pumped into the well. The phosphate of choice is a molecularly dehydrated alkali metal phosphate having an $Na_2O$ to $P_2O_5$ ratio within the range of $Na_4P_2O_7$ to $NaPO_3$, and is exemplified by sodium polyphosphate, tetrasodium pyrophosphate, and sodium tripolyphosphates.

The rmatio of carbonate to phosphate which can be present in the water going to the well cavity is widely variable. The amount, like the ratio, of soluble carbonate and soluble phosphate which is added to the dissolving water is also widely variable, depending on the amount and nature of the calcium sulfate present in the salt; thus, where brine is to be obtained from a well whose salt content is in the form of Southern Rock Salt which may contain, mixed with it, from about 1% to 15% of calcium sulfate, then from about 1 to 20 parts per million of the molecularly dehydrated sodium phosphate, having an analytical ratio of 1 to 2 parts of $Na_2O$ to 1 part $P_2O_5$, based on the dissolving water, and about 1 to 300 parts by weight of sodium carbonate for each part by weight of added phosphate, is used.

The following examples will illustrate the advantages which characterize the method of the present invention.

EXAMPLE 1

The unexpected efficacy of combinations of the above described molecularly dehydrated phosphates with sodium carbonate in inhibiting solution of calcium sulfate will be seen from results of the following tests.

A solid salt core composed of Southern Rock Salt and representing a section of a boring through a salt dome was suspended on wire mesh above a 1.5″ depth of crushed salt core in the bottom of a 4,000 ml. beaker. All of the solutions were agitated every three hours and allowed to settle on hour before the first samples were taken. The results are illustrated below:

*Table 1*

|   | Composition of Dissolving Water Prior to Use | pH | Brine Samples 19 hours after immersing salt core | | Brine Samples 160 hrs. after immersing salt core | | Brine Sample 168 hrs. after immersing salt core | |
|---|---|---|---|---|---|---|---|---|
|   |   |   | Ca, g.p.l. | SO₄, g.p.l. | Ca, g.p.l. | SO₄, g.p.l. | Ca, g.p.l. | SO₄, g.p.l. |
| A | Distilled water<br>0.1 g.p.l. NaHCO₃<br>0.2 g.p.l. Na₂CO₃ | 10.3 | .33 | .76 | .73 | 1.79 |   |   |
| B | Distilled water<br>3 p.p.m. of tetrasodium pyrophosphate. | 6.9 | .49 | 1.05 | .96 | 2.38 |   |   |
| C | Distilled water<br>6 p.p.m. of tetrasodium pyrophosphate. | 7.1 | .41 | .87 | .62 | 1.50 |   |   |
| D | Distilled water<br>0.5 g.p.l. NaHCO₃<br>0.2 g.p.l. Na₂CO₃ | 9.6 |   |   |   |   | .85 | 1.90 |
| E | Distilled water<br>0.5 g.p.l. NaHCO₃<br>0.2 g.p.l. Na₂CO₃<br>3 p.p.m. PO₄ (Nalco 918) | 9.6 |   |   |   |   | .23 | .65 |
| F | Distilled water<br>0.1 g.p.l. NaHCO₃<br>0.2 g.p.l. Na₂CO₃<br>3 p.p.m. tetrasodium pyrophosphate. | 10.1 |   |   |   |   | .24 | .72 |
| G | Distilled water<br>0.1 g.p.l. NaHCO₃<br>0.2 g.p.l. Na₂CO₃<br>10 p.p.m. tetrasodium pyrophosphate. | 10.1 |   |   |   |   | .10 | .43 |
| H | Distilled water<br>0.1 g.p.l. NaHCO₃<br>0.2 g.p.l. Na₂CO₃<br>20 p.p.m. tetrasodium pyrophosphate. | 10.1 |   |   |   |   | .10 | .44 |
| I | Distilled water |   |   |   | 1.4 | 3.05 |   |   |

This phenomenon wherein incorporation, in the dissolving water, of mixtures of sodium carbonate, bicarbonate, and the molecularly dehydrated phosphate results in an unexpectedly large decrease in the sulfate content of the resulting brine does not, however, occur when the dissolving water contains mixtures of sodium carbonate and trisodium phosphate, especially when long contact times of dissolving water and salt are involved. This is illustrated in Table 2, below. In carrying out the tests whose data is shown in Table 2, powdered anhydrous calcium sulfate in the amount of 1 g.p.l. was added to chemically pure salt brine containing the test chemicals. The test samples were agitated with air for a period of 30 minutes and were then filtered and analyzed:

*Table 2*

| P.p.m. Chemicals Added to Brine | | Brine Analysis (SO₄) | |
|---|---|---|---|
| Sodium Carbonate | Phosphate | M/l. SO₄ | G.p.l. SO₄ |
|   | 50 Sodium Hexametaphosphate | 0.0059 | 0.565 |
| 1,000 | ---do--- | 0.0019 | 0.182 |
|   | 50 Trisodium Phosphate | 0.0077 | 0.740 |
| 1,000 | ---do--- | 0.0078 | 0.748 |
|   | 50 Tetra Sodium Pyrosphate | 0.0036 | 0.346 |
| 1,000 | ---do--- | 0.0016 | 0.153 |

It is seen from the above table that where trisodium phosphate alone was the additive, the resulting brine contained .740 g.p.l. of SO₄; that where both trisodium phosphate and sodium carbonate, in the amounts shown, were the additives, the SO₄ content of the resulting brine was practically the same, namely .748. That when sodium hexametaphosphate, a molecularly dehydrated phosphate of the type described hereinbefore, was added to the brine the resulting SO₄ content was 0.565 g.p.l.; but that when sodium carbonate and sodium hexametaphosphate were added to the brine the SO₄ content dropped drastically to 0.182. The same surprising phenomenon was observed when both tetrasodium pyrophosphate and sodium carbonate were added to the brine. Alone, the tetrasodium pyrophosphate resulted in a sulfate content in the brine of 0.346, and when sodium carbonate was used in concert therewith, the SO₄ content dropped surprisingly to 0.153.

The tests resulting in the above data were accelerated tests which showed results which would be otherwise obtainable only after substantially longer periods than the actual 30 minute contact time under the accelerated conditions of the tests.

The superiority of the instant process was further demonstrated in results obtained using a brine well whose salt source was Southern Rock Salt, and in which a comparison was made of the effect on calcium sulfate content of the resulting brine of (a) a treatment which comprised treating the dissolving water so that is contained sodium bicarbonate, sodium carbonate and trisodium phosphate, with (b) treatment of the dissolving water so that it contained (after treatment) sodium bicarbonate, sodium carbonate and a molecularly dehydrated polyphosphate.

In carrying out the runs which illustrated (a) and (b) above, the water pumped into the cavity of the well contained about 0.2 to 0.3 g.p.l. of sodium carbonate and approximately 0.1 to about 0.2 g.p.l. of sodium bicarbonate. The carbonate component of the water resulted partly from addition to the water of "cell liquor" from an electrolysis cell producing chlorine, which contained approximately 10% sodium hydroxide.

The size of the cavity in this well, the rate of delivery of water thereto, and the rate of brine removal therefrom, was such that there was a time lag of at least several weeks before the calcium sulfate content of the brine withdrawn from the well would reflect results of the treatment given to the water pumped into the cavity.

It was found that when the water entering the cavity had been treated in accordance with (a) above, namely so that it contained the specified amounts of sodium carbonate, bicarbonate, and trisodium phosphate, the calcium sulfate content of the brine withdrawn thereafter was essentially unchanged from what it was when the entering water contained the foregoing amounts of carbonate and bicarbonate, but no trisodium phosphate.

When, subsequently, the composition of the dissolving water was modified, as per (b) above, so that it contained, in addition to the aforesaid carbonates and bicarbonates, 3 p.p.m. of sodium decaphosphate, the calcium sulfate content of the resulting brine was significantly reduced from an original 3.5 down to approximately 1.5 g.p.l. of calcium sulfate.

When carrying out the process of the present invention using dissolving water which contains calcium and magnesium in solution, then the addition thereto of the phosphate should preferably be made prior to the incorporation in that water of sodium carbonate. I have found that unless this is done objectionable scaling of the conduits may occur.

In summary, my invention provides an improved procedure for producing brine low in calcium sulfate content from brine wells whose salt component is Southern Rock Salt, or from salt-dissolvers where a long residence or contact time of the dissolving water and the rock salt occurs, and which is significantly more efficient and economical than the methods heretofore in use.

It is to be understood, of course, that the embodiments described above are illustrative of my invention, and are not limitative since it will be apparent that variations therein may be made without departing from the spirit and scope of my invention.

This is a continuation-in-part of my co-pending application, Serial No. 433,787, filed June 1, 1954, and now abandoned.

I claim:

1. In a method of preparing sodium chloride brine wherein water containing bicarbonates and an impure sodium chloride containing calcium sulfate as an impurity are brought into contact to form said brine, the improvement which comprises inhibiting solution of the calcium sulfate in said brine as it is formed by adding to said water, (a) 1 to 20 p.p.m. of a molecularly dehydrated sodium phosphate having an analytical ratio of 1 to 2 parts of $Na_2O$ to 1 part $P_2O_5$, and (b) sodium hydroxide sufficient to produce from the bicarbonate content of said water from about 1 to 300 parts by weight of sodium carbonate for each part by weight of added phosphate, and contacting said treated water with the impure sodium chloride to form a sodium chloride brine low in calcium and sulfate ions.

2. In the method of producing sodium chloride brine wherein water is conveyed into the cavity of a brine well and the sodium chloride brine formed is subsequently removed therefrom, the improvement which comprises incorporating in the said dissolving water from 1 to 20 p.p.m. of a molecularly dehydrated sodium phosphate having an analytical ratio of 1 to 2 parts of $Na_2O$ to 1 part $P_2O_5$, and from about 1 to 300 parts by weight of sodium carbonate for each part by weight of the said added phosphate.

3. In the method of producing sodium chloride brine wherein water is conveyed to a salt dissolver containing rock salt and the resulting sodium chloride brine which is formed is subsequently removed from the dissolver, the improvement, which comprises incorporating in the said dissolving water 1 to 20 p.p.m. of a molecularly dehydrated sodium phosphate, having an analytical ratio of 1 to 2 parts of $Na_2O$ to 1 part $P_2O_5$, and from about 1 to 300 parts by weight of sodium carbonate for each part by weight of added phosphate.

4. In a process of producing chlorine by the electrolysis of a sodium chloride brine, wherein the brine is formed from water having a high natural content of bicarbonates and impure sodium chloride containing calcium sulfate as an impurity, the improvement which comprises inhibiting solution of the calcium sulfate in said brine as it is formed by adding to said water containing bicarbonates from 1 to 20 p.p.m. of a molecularly dehydrated sodium phosphate having an analytical ratio of 1 to 2 parts of $Na_2O$ to 1 part $P_2O_5$, and cell-liquor resulting from said electrolysis and containing sodium hydroxide sufficient to produce from said bicarbonates sodium carbonate in the ratio of from about 1 to 300 parts by weight of sodium carbonate for each part by weight of added phosphate, bringing the thus treated water into contact with the impure sodium chloride containing calcium sulfate to form a brine, conducting the formed brine which is low in calcium and sulfate ions to an electrolysis cell, producing chlorine in said cell from the brine by electrolysis, removing from said cell a cell-liquor containing some sodium hydroxide after the electrolysis operation, and adding said cell-liquor to the water having a high natural content of bicarbonate to continue the process.

References Cited in the file of this patent

UNITED STATES PATENTS

| | | |
|---|---|---|
| 1,999,709 | Terzier | Apr. 30, 1935 |
| 2,433,601 | Comstock | Dec. 30, 1947 |
| 2,751,357 | Bowman | June 19, 1956 |

FOREIGN PATENTS

| | | |
|---|---|---|
| 210,628 | Great Britain | Feb. 7, 1924 |